United States Patent [19]

Kapany et al.

[11] 4,265,222
[45] May 5, 1981

[54] SEE-THROUGH SOLAR COLLECTOR

[76] Inventors: Narinder S. Kapany, 2126 Greenways Dr., Woodside, Calif. 94061; Fred C. Unterleitner, 3732 Grove Ave., Palo Alto, Calif. 94303

[21] Appl. No.: 933,513

[22] Filed: Aug. 14, 1978

Related U.S. Application Data

[63] Continuation-in-part of Ser. No. 933,513, Aug. 14, 1978, abandoned.

[51] Int. Cl.$^3$ .............................................. F24J 3/02
[52] U.S. Cl. .................................. 126/431; 126/449; 126/444; 165/48 S
[58] Field of Search ............... 126/270, 271, 417, 428, 126/429, 441, 444, 445, 449, 450, 431, 419, 423; 237/1 A; 165/48 S; 350/263; 245/11

[56] References Cited

U.S. PATENT DOCUMENTS

| | | | |
|---|---|---|---|
| 2,194,222 | 3/1940 | Ewing | 245/11 |
| 2,545,906 | 3/1951 | Watkins | 350/263 |
| 2,918,709 | 12/1959 | Corcoran | 126/417 X |
| 3,276,942 | 10/1966 | Ewing | 350/263 X |
| 3,875,925 | 4/1975 | Johnston | 126/270 |
| 3,925,945 | 12/1975 | White | 126/429 X |
| 3,952,947 | 4/1976 | Saunders | 126/270 |
| 3,971,359 | 7/1976 | Bourne | 126/270 |
| 3,990,635 | 11/1976 | Restle et al. | 126/429 |
| 4,050,443 | 9/1977 | Peck et al. | 126/270 |
| 4,114,595 | 9/1978 | Barker | 126/441 |
| 4,116,220 | 9/1978 | Burd | 126/271 |
| 4,135,490 | 1/1979 | Soleau, Jr. | 126/270 |
| 4,147,300 | 4/1979 | Milburn, Jr. | 126/270 |

Primary Examiner—James C. Yeung
Assistant Examiner—Larry Jones
Attorney, Agent, or Firm—Townsend and Townsend

[57] ABSTRACT

An insulating window which has louvered radiant energy absorbing screen positioned in the airspace between inner and outer spaced apart window panes, said airspace connected at the top to electrically actuated dampers and blower in a duct system, and said airspace connected at the bottom to the interior of the room through an air filtering element. In the preferred embodiment, temperature sensors and electronic logic system provide control of air flow rate and valve settings to accomplish space heating, water heating and/or exterior venting of hot air as required by weather conditions and building heat demands.

9 Claims, 3 Drawing Figures

SEE-THROUGH SOLAR COLLECTOR

CROSS REFERENCE TO RELATED APPLICATION

This application is a continuation-in-part of applicant's prior application, Ser. No. 933,513, filed Aug. 14, 1978, now abandoned.

BACKGROUND OF THE INVENTION

This invention relates to an efficient modular air heating solar collector which also provides excellent visibility when used as a window facade element. When used in conjunction with its control system, the present invention provides energy savings by hot air heating, by reduction of solar heat load in hot weather and by providing improved thermal insulation of the window areas in the absence of direct sunshine.

Solar energy collection for space and water heating is generally considered in terms of flat plate collectors placed on the roof of the building. The present capital costs of flat plate collectors relative to the cost of fuel which they replace precludes their use in many residential and commercial structures. Since window facade elements already include the glazing and frames, which are significant cost factors in flat plate collectors, utilizing these for the purpose of also collecting solar energy for space and water heating can significantly reduce the incremental capital cost of solar energy collection.

There has been concern over the detrimental effects of window areas on building performance for some time. The most prominent of these effects are:
(1) Large fluctuations in the solar heat loading during the day, raising the complexity and cost of air conditioning systems,
(2) poor thermal insulation of window areas, resulting in large heat loss or gain when large exterior to interior temperature difference occur.
(3) unacceptable glare at certain times of day and
(4) rapid deterioration of fabrics and furnishings exposed to direct sunlight through windows.

Some architects have considered these disadvantages of windows to be so serious as to resort to windowless or almost windowless structures. However, the psychological benefits to the occupants provided by the visual panpramas through windows are so great windowless spaces are considered highly undesirable by most people.

Prior art contains many improvements over simple windows to overcome one or more of their drawbacks. Double pane windows with sealed space between them are commonly used to reduce heat transfer through window areas. Various screens, louvered blinds or awnings are used to reduce or eliminate glare and damage caused by direct sunlight, often at considerable expense to the see-through property of the window. Of particular relevance to the present invention, Wild (U.S. Pat. No. 3,793,931 1974) has incorporated a venetian blind between two windows in order to block glare and has added air flow means for causing air to flow out from the building interior through the space containing the louvered blind to the exterior of the building for removal of solar induced heat from the blinds to the exterior of the building. As a variation on this invention, Bourne (U.S. Pat. No. 3,971,359 1976) and Custer (U.S. Pat. No. 3,981,445 1976) teach the connection of such a louvered window structure to a central duct system which can distribute the solar generated heat throughout the building when needed. Furthermore, Fuschillo (*Solar Energy* vol. 17, pp 159–165 1975) teaches various venting and window coating means whereby window areas can be used to act as solar collectors and to regulate interior temperature and lighting.

While the above references provide valuable teachings for the improved utility of window areas in buildings, the present invention provides a practical modular facade element and control system therefore which optimizes the visual and thermal efficiency of the see-through air heating solar collector.

SUMMARY OF THE INVENTION

The present invention consists of an improved see-through air heating solar collector with associated control system, consisting of inner and outer spaced apart window panes with a light pervious radiant energy absorbing member positioned centrally between the inner and outer panes, and convective means for passing air through the space to remove heat from the absorbing member.

In the preferred embodiment of the invention, the light pervious and radiant energy absorbing member is a louvered metallic screen having louvers spaced vertically less than the normal resolving power of the human eye at the mean viewing distance within the room, and coated with a high solar absorptivity coating on the upper and outer side of the louvers, and a highly infrared reflecting (low emissivity) coating on the lower and inner side of said louvers. The convective means in said preferred embodiment provide for air intake from the room at the lower horizontal frame member through a dust removing filter in the inlet vent and air outlet through slots in the upper horizontal frame element to an insulated duct connected through a damper to a central blower. Damper opening and blower speed in the preferred embodiment are controlled by a microprocessor which is connected to temperature sensors outdoors, at the top of each window element, and interior to the building, and has an internal clock providing local solar time as well as memory providing standard climatic data and stoereed program for anticipatory control of the system. The same microprocessor also sets air and water flow valves in the system to optimally utilize the hot air generated by the collectors for building space heating, hot water preheating and/or release outside the building.

It is an object of the present invention to provide a see-through air heating solar collector which provides minimal reduction in outward visibility compared to conventional windows.

It is another object of the invention to provide a modular facade element for buildings which will be economical to install.

It is a further object of the invention to provide air heating solar energy collection to reduce the energy cost of operating a building and to provide payback thereby for the added initial installation cost.

It is a further object of the invention to increase the comfort of occupants of the building by eliminating glare and large temperature fluctuations due to direct solar radiation through window areas.

It is a further object of the invention to protect fabrics and furnishings within the building from the deleterious effects of direct solar radiation.

It is a further object of the invention to provide an automatic control interface between the see-through solar collector modules and the building comfort conditioning system to optimize the comfort and energy conserving capabilities of the invention.

The foregoing and other objectives, features and advantages of the invention will be more readily understood upon the following detailed description of certain preferred embodiments of the invention, taken in conjunction with the following drawings:

DETAILED DESCRIPTION OF THE PREFERRED EMBODIMENT

Figure 1:
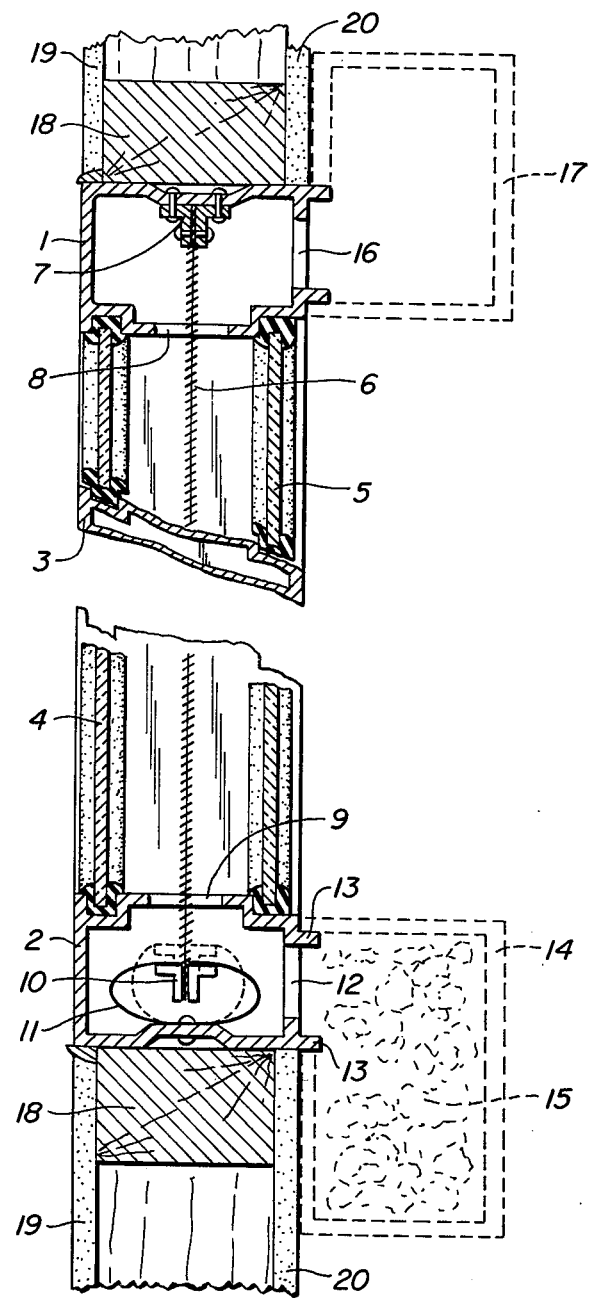
FIG. 1 is a vertical view in section of the preferred embodiment of the invention.

Referring to FIG. 1, a vertical cross section of the preferred embodiment of the facade module see-through solar collector is shown. This module consists of horizontal frame element aluminum extrusions comprising the upper frame element 1 and lower frame element 2, vertical frame element aluminum extrusions 3 for the sides of the frame, silicone rubber gasketed outer pane 4 and readily removable inner pane 5; centrally located in the frame is the energy absorbing element 6 mounted rigidly to the upper frame member by angle strip 7 and extending through a slot 8 in the lower surface of the upper extrusion which extends the full length of the window aperture, the screen being coextensive with the window area, and extending through the slot 9 in the upper surface of the lower horizontal window member to an angle strip 10 which is periodically connected to the lower frame element by spring steel tensioning loops 11, said loops compensating for thermal expansion of the microlouver element while maintaining constant tension therein. Slots 12 are provided in the interior vertical surface of the lower frame member for air intake, said member also having extruded fins 13 for ready attachment of the air intake duct 14 containing dust filtering material 15; the identical upper extrusion also has slots 16 on the inner vertical surfaces for air outlet and fins for attachment of the insulated air exhaust duct 17. The building framing members 18 and exterior facade material 19 as well as the interior facade material 20 are shown to indicate typical installation of the modular see-through solar collector unit.

Figure 2:
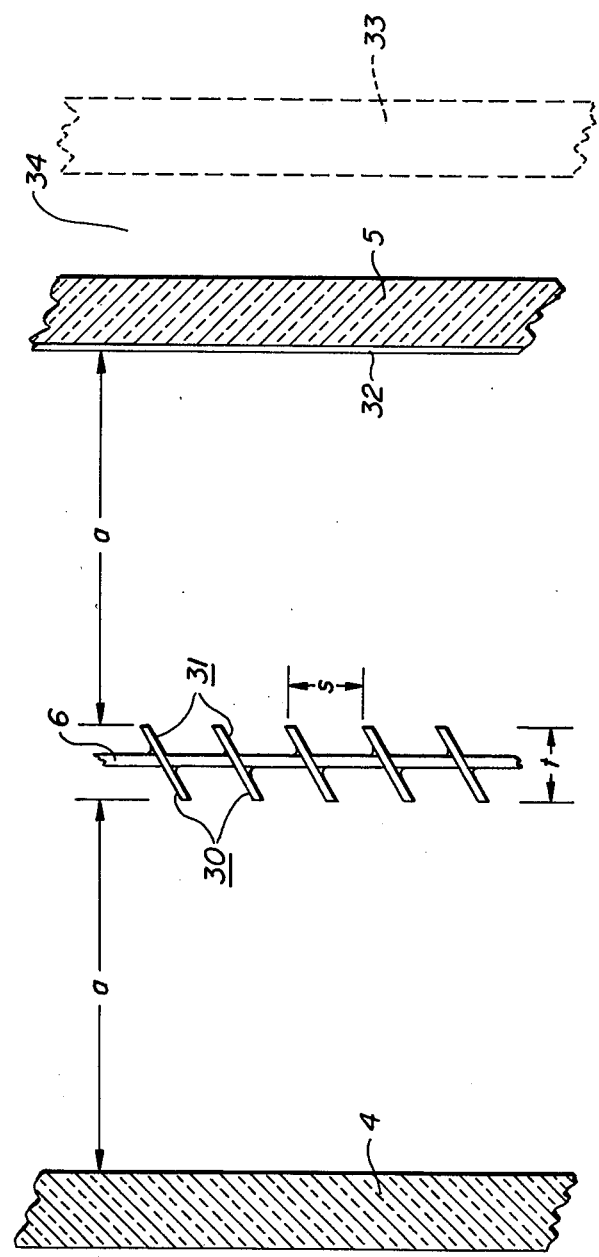
FIG. 2 is an enlarged section showing the key design factors.

Referring now to FIG. 2, an enlarged cross section of the central part of the see-through solar collector is shown to elucidate the design considerations. Several louvers of the microlouvered radiant energy absorbing screen 6 are shown centrally located between the outer transparent pane 4 and the inner transparent pane 5. A first design consideration is that the louvered screen shall be rendered diaphanous for the average viewing distance within the room by considering the normal acuity of human vision, which is barely able to resolve two strips spaced by a center distance of two arc minutes. Transferring this well known fact to measurements useful in the present design, let s be the center spacing of adjacent louvers and D be the mean viewing distance within the room between the observer and the window, then the louver spacing is given by the relationship;

$$s \leq D \tan(2.0') = 0.0006\, D.$$

Thus, according to this criterion, the louver spacing for a 10 foot viewing distance should be 0.07" or less. We herein refer to louvers with such close spacing as "microlouvers" to distinguish them from larger louvers such as conventional venetian blinds.

It is a further important design consideration that the air space between such microlouver layer and the interior surface of the windows enclosing said airspace is adequate to insure that there is laminar air flow near the glass to improve thermal insulation at the air to glass boundary, while permitting turbulent flow near the microlouver screen to optimize heat transfer from the radiation absorbing screen to the air. While there is no simple criterion for insuring suitable geometric and air flow parameters to satisfy this condition, a rule of thumb developed for the range of louver size and air flow velocities normally encountered is that the cross sectional spacing of the plane containing the edges of the louvers and the nearest window surface (a in FIG. 2) be at least 10 times the louver thickness (t in FIG. 2):

$$a \geq 10 t.$$

A further design consideration is that absorption of direct solar radiation be optimized for the upward and outward facing surfaces of the louvers 30, whereas thermal reradiation should be minimized, particularily from the inward and downward facing surfaces 31 of said screen. The preferred coating material for the microlouver screen is therefore a solar selective absorber, such as "black chrome" commonly used in solar collectors. An alternative coating method, which is only slightly less effective, is to use flat black high temperature paint on the outer surfaces 30 while utilizing bare metal or metallic paint on the inner surfaces 31. A further desirable embodiment for this purpose is the use of an infrared reflective film 32 on the surface of the inner pane 5 nearest to the microlouver screen 6, a typical material for such a film being stannic oxide ($SnO_2$). The reduction of radiative heat transfer from the radiant energy absorbing screen to the windows by the above mentioned methods can be as much as 30% under typical clear day operating conditions, and these methods also significantly improve the thermal resistance or "U" value of the windows in their passive state when no direct sunlight is incident thereon.

Referring again to FIG. 2, an embodiment which is desirable for regions having predominantly hot clear weather adds an additional transparent pane 33 interior to the inner pane 5 of the previously described module and separated therefrom by a sealed space 34, such modification further reducing heat transfer to the interior space when direct sunlight is incident upon the collector and further reducing the air conditioning load in hot weather even in the absence of direct solar radiation. In like fashion an additional transparent pane is desirable exterior to the pane 4 and separated therefrom by a sealed space when the module is to be used in regions having predominantly very cold exterior temperatures, said extra pane serving to limit heat loss from the radiation absorbing member to the exterior of the building and thus improving its efficiency while also increasing the total thermal resistance of the see-through solar collector facade module in the absence of direct sun.

Figure 3:
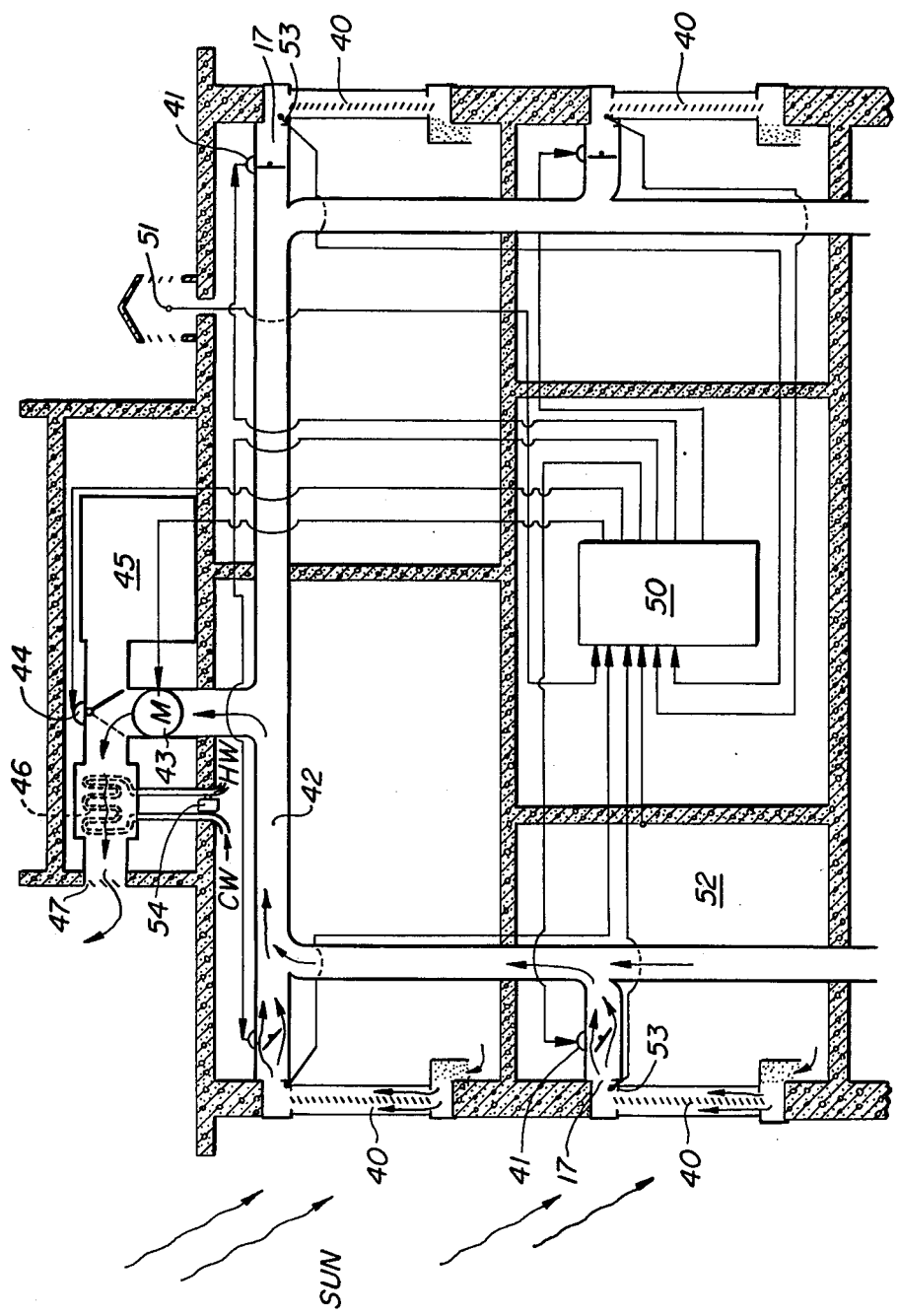
FIG. 3 is a schematic diagram of the preferred duct and control system as installed in a building.

Referring now to FIG. 3, the preferred method for integrating the see-through solar collector with the building heating, ventilating and air conditioning system is shown schematically. The afore described see-through solar collector facade module 40 is shown connected via its exhaust duct 17 and electrically actuated damper valve 41 to the insulated solar collector manifold 42 of the building. A variable speed blower 43 in said manifold provides the pressure difference which draws air through the facade elements 40 when the associated damper is open or partially open. Upon passing through the blower 43 the hot air enters a two way air valve 44, passing either into the building hot air heating plenum via the HVAC system 45, or into an air to water heat exchanger 46 and thence to the exterior of the building through the vent 47. The heat exchanger 46 serves to utilize the excess solar heat for the purpose of pre-heating the cold water from the mains prior to entering the hot water heater of the building.

Referring again to FIG. 3, the preferred embodiment contains a microprocessor logic unit for controlling the operation of the solar collector system. The microprocessor 50 has input temperature sensors from the exterior of the building (shaded from direct sun) 51, from the interior of the building 52, and from the outlet plenum of each facade module 53, and provides output to each of the damper actuators 41, the solar manifold blower 43, and the two way air valve 44 and water bypass valve 54 in the water supply line. The memory elements of the microprocessor contain the parameters for standard daily temperature variation at the building site, permitting hourly and seasonally adjusted anticipatory setting of the controls such that the overall building energy use is minimized. The microprocessor is time shared to scan all the temperature sensors and dampers of the facade modules in a time comparable to the module thermal time constant, so that each module contributes optimally whatever its orientation with respect to the sun or shading by other buildings, trees or clouds may be at a given time.

Whereas the present description of a preferred embodiment of the invention is intended to set forth the primary features of the invention, it is to be understood that the invention is not limited thereto, but may otherwise be variously embodied and practiced within the scope of the following claims:

We claim:

1. A see-through building facade module for use in a wall of a room in a building comprising:
   a frame adapted to be mounted in said wall;
   interior and exterior transparent parallel panes mounted within said frame to define an air space therebetween;
   a louvered radiant solar energy absorbing screen centrally located within said air space and coextensive with the area of said panes, said louvered screen being characterized by a screen thickness, said louvered screen having louvers sloping downward toward said exterior pane, the vertical separation of individual louvers being sufficiently small so as to subtend no more than approximately 2 arc minutes at the mean viewing distance within said room said louvers including an absorptive coating thereon;
   said louvered screen being spaced apart from the nearest faces of each of said interior and exterior panes by a distance at least 10 times said screen thickness;
   said frame being provided with air flow slots at its top and bottom to establish an upward flow through said air space, said small louver spacing promoting substantially turbulent air flow in the region of said louvered screen to promote effective heat transfer from said louvered screen to said flowing air in the vicinity of said louvered screen, said separation of at least 10 times said thickness preventing said region of turbulence from extending to said interior and exterior panes, thus allowing laminar flow proximate said panes to reduce heat transfer through said panes, thus providing effective heat collection and effective shielding of said room.

2. The invention of claim 1, and further comprising:
   means defining an intake duct; and
   a body of dust removing filtering material within said intake duct.

3. The invention of claim 1, and further comprising spring tension mounts for positioning said louvered screen centrally in said air space while compensating for thermal expansion of said louvered screen relative to said frame.

4. The invention of claim 1 wherein said louvered screen has an outer surface characterized by a low emissivity for thermal infrared radiation.

5. The invention of claim 1 wherein said interior transparent pane has a surface facing said louvered screen characterized by a high reflectivity for infrared radiation and a high transmissivity for visible radiation.

6. The invention of claim 1, and further comprising an additional transparent pane spaced apart from and interior of said interior pane.

7. The invention of claim 1, and further comprising an additional transparent pane exterior of said exterior pane and spaced apart therefrom by a sealed space.

8. The invention of claim 1 wherein said absorptive coating is formed from a material that is a solar selective absorber.

9. The invention of claim 1 wherein said absorptive coating is only on an outwardly facing surface of said louvers.

* * * * *